(12) United States Patent
Barbu et al.

(10) Patent No.: US 11,973,866 B2
(45) Date of Patent: Apr. 30, 2024

(54) CRYPTOGRAPHIC PROCESSING METHOD, RELATED ELECTRONIC DEVICE AND COMPUTER PROGRAM

(71) Applicant: IDEMIA France, Courbevoie (FR)

(72) Inventors: Guillaume Barbu, Courbevoie (FR); Alberto Battistello, Courbevoie (FR); Luk Bettale, Courbevoie (FR); Nicolas Debande, Courbevoie (FR); Christophe Giraud, Courbevoie (FR); Sarah Lopez, Courbevoie (FR); Franck Rondepierre, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 504 days.

(21) Appl. No.: 17/354,494

(22) Filed: Jun. 22, 2021

(65) Prior Publication Data

US 2021/0409208 A1 Dec. 30, 2021

(30) Foreign Application Priority Data

Jun. 26, 2020 (FR) .................................. 2006695

(51) Int. Cl.
*H04L 9/08* (2006.01)
*G06F 7/72* (2006.01)

(52) U.S. Cl.
CPC ............ *H04L 9/0869* (2013.01); *G06F 7/721* (2013.01)

(58) Field of Classification Search
CPC ................................ H04L 9/0869; G06F 7/721
See application file for complete search history.

(56) References Cited

U.S. PATENT DOCUMENTS

| 9,014,368 B2* | 4/2015 | Teglia | H04L 9/002 |
| | | | 380/28 |
| 2004/0215685 A1* | 10/2004 | Seifert | H04L 9/302 |
| | | | 708/492 |

(Continued)

FOREIGN PATENT DOCUMENTS

| CN | 108111309 | 6/2018 |
| FR | 3 004 043 | 10/2014 |

OTHER PUBLICATIONS

Ciet, Mathieu et al., (Virtually) Free Randomization Techniques for Elliptic Curve Cryptography, 2003, Information and Communications Security, ICICS 2003. Lecture Notes in Computer Science, vol. 2836 (Year: 2003).*

(Continued)

*Primary Examiner* — Jung W Kim
*Assistant Examiner* — Alan Lingqian Kong
(74) *Attorney, Agent, or Firm* — NIXON & VANDERHYE

(57) ABSTRACT

A cryptographic processing method comprises the following steps:
obtaining a second number determined by adding to a first number the order of a finite group or a multiple of this order;
determining a quotient and a remainder by dividing the second number by a random number;
obtaining a third element equal to the combination of elements equal to a first element of the finite group and in number equal to the product of the quotient and the random number;
obtaining a fourth element equal to the combination of elements equal to the first element and in number equal to the remainder;

(Continued)

Figure 1:
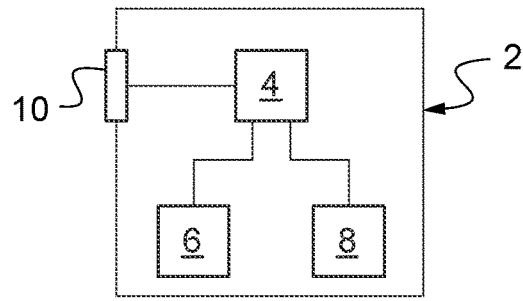

determining a second element by combining the third element and the fourth element.

11 Claims, 1 Drawing Sheet

(56) References Cited

U.S. PATENT DOCUMENTS

2005/0232430 A1* 10/2005 Gebotys .................. H04L 9/003
 380/286
2012/0321075 A1* 12/2012 Joye ........................ H04L 9/302
 380/28

OTHER PUBLICATIONS

Ha, Jaecheol et al., A new CRT-RSA scheme resistant to power analysis and fault attacks, Nov. 2008, Third International Conference on the Convergence and Hybrid Information Technology (Year: 2008).*

Joye, Protecting RSA Against Fault Attacks: The Embedding Method, 2009, Fault Diagnosis and Tolerance in Cryptography (FDTC), 2009 Workshop on IEEE (Year: 2009).*

Joye, "Protecting RSA against Fault Attacks: The Embedding Method," 2009 Workshop on Fault Diagnosis and Tolerance in Cryptography (FDTC), IEEE Computer Society, Sep. 6, 2009, pp. 41-45.

Ha et al., "A New CRT-RSA Scheme Resistant to Power Analysis and Fault Attacks," Third 2008 International Conference on Convergence and Hybrid Information Technology, IEEE Computer Society, Nov. 11-13, 2008, pp. 351-356.

FR Search Report issued in FR Patent Application No. 21180397.8 dated Nov. 22, 2021.

Battistello, "On the security of embedded systems against physical attacks," Jun. 29, 2016, pp. 1-156, XP055860158, Paris, URL:https://www.theses.fr/2016SACLV047.pdf.

Search Report for FR2006695, dated Mar. 12, 2021, 10 pages.

Joye, "Protecting RSA against Fault Attacks: The Embedding Method", Fault Diagnosis and Tolerance in Crytography (FDTC), 2009 Workshop on IEEE, Sep. 6, 2009, pp. 41-45.

Jaecheol et al., "A New CRT-RSA Scheme Resistant to Power Analysis and Fault Attacks", 2008 Third International Conference on Convergence and Hybrid Information Technology, Nov. 11-13, 2008, [pp. 351-356.

Ciet M., Joye M. (2003) In: Qing S., Gollmann D., Zhou J. "(Virtually) Free Randomization Techniques for Elliptic Curve Cryptography." (eds) Information Communications Security. ICICS 2003. Lecture Notes in Computer Science, vol. 2836, Springer, Berlin, Heidelberg. https://doi.org/10.1007/978-3-540-39927-8_32.

* cited by examiner

CRYPTOGRAPHIC PROCESSING METHOD, RELATED ELECTRONIC DEVICE AND COMPUTER PROGRAM

This application claims priority to FR Patent Application No. 2006695 filed 26 Jun. 2020, the entire contents of which is hereby incorporated by reference.

The present invention relates to the technical field of cryptography.

It relates more particularly to a cryptographic processing method, as well as to a related electronic device and computer program.

In this technical field, in different applications, elements of a finite order group provided with an operation are handled.

For example, for signing or decrypting a message by means of a secret key, a first element of the group is associated with the message and a second element equal to the combination is determined, by means of said operation, of elements equal to the first element and in number equal to a first number linked to the secret key.

The determination of such a second element is relatively simple; for well-chosen groups, on the other hand, it is very difficult (in practice: impossible in a reasonable time) to determine the first number on the basis of the first element and the second element (discrete logarithm problem), which allows to keep the secret character of the first number.

The calculations implemented to determine the second element are, however, the object of attacks by malicious people seeking, for example, to know the secret key.

In order to make more difficult or even prevent such attacks, it has already been proposed (as described for example in "(*Virtually*) *Free Randomization Techniques for Elliptic Curve Cryptography*", by M. Ciet and M. Joye, ICICS 2003, LNCS 2836, pp. 348-359, 2003) for the determination of the second element to be carried out by different calculations each time the cryptographic algorithm is implemented; for this purpose:
- a quotient and a remainder are determined by Euclidean division of the first number by a random number (different for each implementation of the cryptographic algorithm);
- a third element equal to the combination, by means of said operation, of elements equal to the first element and in number equal to the product of the quotient and the random number, is determined;
- a fourth element equal to the combination, by means of said operation, of elements equal to the first element and in number equal to the remainder, is determined;
- the second element is determined by combining, by means of said operation, the third element and the fourth element.

However, such a countermeasure can be circumvented when the attacker can choose the secret key used by the concerned cryptographic algorithm.

Indeed, by choosing in this case a secret key of low value, the quotient obtained during the execution of the cryptographic algorithm is almost systematically zero and the various implementations of the cryptographic algorithm are therefore ultimately identical.

The attacker can thus improve his knowledge of the operations performed during the execution of the cryptographic algorithm and use this knowledge to attack other uses of the cryptographic algorithm, with another secret key ("profiled side channel attack").

In this context, the invention proposes a cryptographic processing method comprising the determination, in a finite order group provided with an operation and from a first element of this group, of a second element equal to the combination, by means of said operation, of elements (of this group) equal to the first element and in number equal to a first number, wherein said cryptographic processing method comprises the following steps:
- obtaining a second number determined by adding to the first number said order or a multiple of said order;
- determining a random number;
- determining a quotient and a remainder using the Euclidean division of the second number by the random number;
- obtaining a third element equal to the combination, by means of said operation, of elements (of this group) equal to the first element and in number equal to the product of the quotient and the random number;
- obtaining a fourth element equal to the combination, by means of said operation, of elements (of this group) equal to the first element and in number equal to the remainder;
- determining the second element by combining the third element and the fourth element by means of said operation.

By adding the order or a multiple of the order, the second number always has a large value and its quotient by the random number will be non-zero. The countermeasure described above will therefore be effective, even if an attacker imposes a low value on the first number.

The searched result (second element) will however be unchanged because the combination, by said operation, of elements equal to a given element (here the first element) and in number equal to the order of the group produces the neutral element of the group (due to the cyclical nature of the group).

The method may comprise a step of determining another random number, and the second number can then be obtained by adding to the first number the product of the other random number and said order.

The method is for example implemented within an electronic device comprising a storage module. The first number and/or said order can then be stored in the storage module in masked form. The second number can in this case also be stored, possibly in masked form.

The method may further comprise a step of constructing a mask equal to the sum of a first intermediate number and the product of a second intermediate number by said random number. The step of obtaining the second number can then comprise a step of applying the constructed mask. Thus, the quotient can be determined using the second intermediate number and the remainder can be determined using the first intermediate number.

According to a first possibility of embodiment, the first intermediate number and the second intermediate number can be determined by random drawing.

According to a second possibility of embodiment, when the first number is stored masked by an initial mask, the second intermediate number and the first intermediate number can respectively be determined as quotient and remainder of the Euclidean division of the initial mask by a power of two (this power of two being for example equal to $2^k$ where k is the length in bits of the random number).

In some embodiments, the aforementioned group may be the multiplicative group $Z/pZ-\{0\}$, where p is a prime number, the order then being equal to (p−1). The operation in this case is the modular multiplication modulo p.

In other embodiments, the group is a subgroup of points of an elliptical curve, said operation being an addition of points of the elliptical curve.

In still other embodiments, the group is a multiplicative subgroup of Z/pZ−{0}, where p is a prime number. The order is then a divisor of (p−1). The operation in this case is the modular multiplication modulo p.

The invention also provides an electronic device comprising a processor and a storage module storing computer program instructions suitable for, when these instructions are executed by the processor, determining, in a finite order group provided with an operation and from a first element of this group, a second element equal to the combination, by means of said operation, of elements equal to the first element and in number equal to a first number, by means of the following steps:

- obtaining a second number determined by adding to the first number said order or a multiple of said order;
- determining a random number;
- determining a quotient and a remainder using the Euclidean division of the second number by the random number;
- obtaining a third element equal to the combination, by means of said operation, of elements equal to the first element and in number equal to the product of the quotient and the random number;
- obtaining a fourth element equal to the combination, by means of said operation, of elements equal to the first element and in number equal to the remainder;
- determining the second element by combining the third element and the fourth element by means of said operation.

The invention also provides a computer program comprising instructions suitable for implementing a method as presented above when these instructions are executed by a processor.

Finally, the invention provides a non-transitory processor-readable recording medium, comprising a computer program stored thereon, which comprises instructions for performing a method as described above, when the instructions are executed by a processor.

Of course, the different features, variants and embodiments of the invention can be associated with each other in various combinations insofar as they are not incompatible or mutually exclusive.

Figure 2:
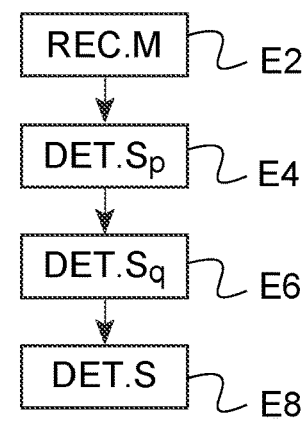
Figure 4:
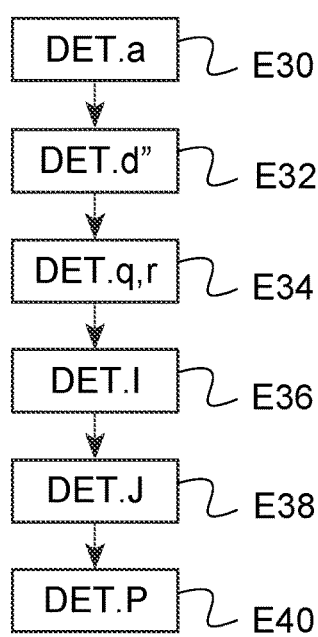
Figure 3:
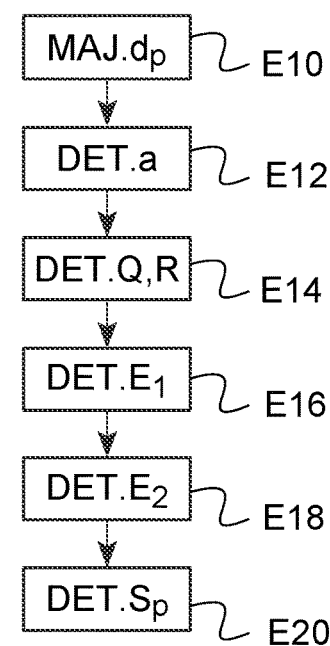

In addition, various other features of the invention emerge from the appended description made with reference to the drawings which illustrate non-limiting embodiments of the invention and where:

FIG. 1 schematically shows an electronic device in accordance with the invention, FIG. 2 is a flowchart representing the main steps of a cryptographic processing method in accordance with the invention, FIG. 3 is a flowchart representing steps implemented during the cryptographic processing method of FIG. 2, and FIG. 4 is a flowchart representing a cryptographic processing method according to another embodiment of the invention.

FIG. 1 schematically shows an electronic device 2 comprising a processor 4 (for example a microprocessor), a storage module 6, a random access memory 8 and a communication module 10.

The storage module 6 stores computer program instructions designed to implement a cryptographic processing method such as at least one of those described below with reference to FIGS. 2, 3 and 4 when these instructions are executed by the processor 4. The storage module 6 is for example in practice a hard disk or a non-volatile memory (optionally rewritable).

The random access memory 8 can in turn store at least some of the elements handled during the various processing operations carried out during this cryptographic processing method.

The communication module 10 is connected to the processor 4 so as to allow the processor 4 to receive data from another electronic device (not shown) and/or to emit data to another electronic device (not shown).

FIG. 2 shows the main steps of a cryptographic processing method according to a first embodiment of the invention.

This method begins at step E2 by receiving a message M by the processor 4 and via the communication module 10. In the context described here, the message M has a length of at least 1024 bits, for example a size of 1024 bits, 2048 bits, 3072 bits or 4096 bits (that is to say here a length comprised between 1024 bits and 4096 bits).

The method of FIG. 2 aims at determining the signature S of the message M by means of an RSA CRT type algorithm. (Alternatively, the message M could be an encrypted message and the application of the RSA CRT type algorithm of FIG. 2 would then allow the decryption of the encrypted message M into a decrypted message S.)

For this purpose, the storage module 6 stores data representative of the elements p, q, $d_p$, $d_q$, $i_q$ of the private key to be used (with the notations usually used for the RSA CRT algorithm and $i_q = q^{-1}$ mod p), where p and q are prime numbers. Each of the elements here has a length in bits equal to half the size of the message M, or here a length in bits of at least 512 bits, for example comprised between 512 bits and 2048 bits.

In the example described here, these elements are stored (in the storage module 6) in masked form, that is to say that the storage module 6 stores:

$$p' = p + m_p$$

$$q' = q + m_q$$

$$d_p' = d_p + m_{dp}$$

$$d_q' = d_q + m_{dq}$$

$$i_q' = i_q + m_{iq}$$

as well as the masks $m_d$, $m_q$, $m_{dp}$, $md_q$, $m_{iq}$.

Each mask here has a length equal to that of the element it masks, that is to say here a length of at least 512 bits, for example comprised between 512 bits and 2048 bits. Each masked value in turn requires 1 bit more for its storage than the concerned element and mask (to store a possible carry) and therefore has a length of at least 513 bits here, for example comprised between 513 bits and 2049 bits.

The method of FIG. 2 comprises a step E4 of determining a first partial result $S_p$ such that $S_p = M^{dp}$ mod p.

In the case where the values are handled masked as described here, the step E4 of determining the first partial result determines in practice $S_p' = M^{dp}$ mod $k_p \cdot p$, where $k_p$ is a random number and where $k_p \cdot p$ is determined by the operation $k_p \cdot p' - k_p \cdot m_p$. This step E4 is implemented in accordance with the method described below with reference to FIG. 3.

The method of FIG. 2 also comprises a step E6 of determining a second partial result $S_q$ such that $S_q = M^{dq}$ mod q.

In the case where the values are handled masked as described here, the step E6 of determining the second partial result determines in practice $S_q'=M^{dq}$ mod $k_q.q$, where $k_q$ is a random number and where $k_q.q$ is determined by the operation $k_q.q'-k_q.m_q$.

This step E6 can be implemented by a method similar to that described below with reference to FIG. 3 (by replacing p by q, $d_p$ by $d_q$ and therefore $k_p$ by $k_q$, p' by q', $d_p'$ by $d_q'$, $m_p$ by $m_q$ and $m_{dp}$ by $m_{dq}$ in the description of FIG. 3).

The method of FIG. 2 then comprises a step E8 of determining the result S of the RSA CRT algorithm (that is to say here of determining the signature S) by combining the first partial result $S_p$ and the second partial result $S_q$ in accordance with the Chinese Remainder Theorem: $S=S_q+q.[i_q.(S_p-S_q)$ mod $p]$.

In the implementation used here where the elements of the private key are stored masked as indicated above, the result S is obtained as follows:

first $W=(S_p'-S_q').i_q'-(S_p'-S_q').m_{iq}$ mod $k_p.p$ is determined;

then S is determined by $S=W.q'-W.m_q+S_q'$ mod N, where $N=(k_p.p.k_q.q)/(k_p.k_q)$.

FIG. 3 shows the steps of a cryptographic processing method according to the invention. This method aims at achieving the modular exponentiation of a value M to the power $d_p$ modulo p. The number $d_p$ is referred to below as "exponent". In the example described here, it is applied to perform step E4 (or step E6) described above, as already indicated. However, this method could be applied in other cases where a modular exponentiation is used.

The modular exponentiation $M^{dp}$ mod p amounts, in the multiplicative group $Z/pZ-\{0\}$, to combine, by means of the modular multiplication modulo p, elements equal to the element M and in number equal to the exponent $d_p$. The order of the multiplicative group $Z/pZ-\{0\}$ is equal to (p−1).

The method of FIG. 3 begins with a step E10 for updating the exponent $d_p$ by adding the order (p−1) thereto.

In the example described here where the prime number p and the exponent $d_p$ are stored in masked form as already indicated, the processor 4 adds during step E10 the masked order (p'−1) to the masked exponent $d_p'$ and stores the result as the current exponent $d_p''$. Moreover, so that the current exponent $d_p''$ is also masked by the mask $m_{dp}$, here the value of the mask $m_p$ is further subtracted from the current exponent $d_p''$ value.

This current exponent dp" is therefore equal to $d_p'+(p'-1)-m_p=[d_p+(p-1)]+m_{dp}$.

In practice, the current exponent dp" can be stored instead of the exponent dp' in the storage module 6 (for use during subsequent implementations of the cryptographic processing method), or only stored in the random access memory 8 (for use only during the present implementation of the method).

Anyway, if some implementations provide that the user can choose the value of the exponent $d_p$ (and that an attacker can thus choose an exponent $d_p$ with a small value as explained in the introduction), the value of the prime number p, on the contrary, cannot be parameterized and is chosen sufficiently high by the designers of the system (the value of p being coded on at least 512 bits). The current exponent $d_p''$ used in the following will therefore necessarily have a high value.

As a variant for step E10, it is possible to update the exponent $d_p$ by adding a multiple of the order (p−1) thereto. Step E10 in this case comprises, for example, drawing a random number a' and updating the exponent $d_p$ by adding thereto the product of the random number a' and the order (p−1). The length in bits of the random number a' is for example comprised between 32 bits and 128 bits. In the embodiment described here storing the elements of the private key in masked form, so that the current exponent $d_p''$ (obtained after updating the masked exponent $d_p'$) is also masked by the mask $m_{dp}$, here the product of the random number a' and the value of the mask $m_p$ is further subtracted from the current exponent dp".

The current exponent dp" obtained in step E10 is therefore valid in this case:

$$d_p'+a'.(p'-1)-a'.m_p=[d_p+a'.(p-1)]+m_{dp}.$$

The method of FIG. 3 continues in step E12 wherein the processor 4 determines a number a (for example having a length k greater than 16 bits, here a length k of 32 bits) by random drawing.

The processor 4 then determines in step E14 the quotient Q' and the remainder R' of the Euclidean division of the current exponent dp" by the random number a. Therefore, we have:

$$d_p'=Q'.a+R'.$$

In the example described here where the current exponent dp" is masked, the masking is furthermore removed by subtracting $m_{dp}/a$ from the masked quotient Q' so as to obtain the unmasked quotient Q, and by subtracting ($m_{dp}$ mod a) to the masked remainder R' to obtain the unmasked remainder R:

$$Q=Q'-m_{dp}/a$$

$$R=R'-m_{dp} \text{ mod } a.$$

In the case where the remainder R is negative (R<0), the processor 4 further performs a corrective step during which the random value a is added to the remainder R and the quotient Q is decremented by one unit.

Then we have: $Q.a+R=d''_p-m_{dp}=d_p$.

The processor 4 can thus determine in step E16 a first modular exponent $E_1$ by performing the modular exponentiation modulo p (or modulo $k_p.p$ in the case of the use of masked values as indicated above) of the element M to the power Q.a (that is to say to a power equal to the product of the quotient Q and the random number a):

$E_1=M^{Q.a}$ mod p (or $E_1=M^{Q.a}$ mod $k_p.p$ in the case of using masked values).

In the multiplicative group $Z/pZ-\{0\}$, this modular exponentiation operation amounts to combining, by means of the modular multiplication modulo p (or modulo $k_p.p$ in the case of using masked values), elements equal to the element M and in number equal to the product of the quotient Q and the random number a.

The processor 4 can thus determine in step E18 a second modular exponent $E_2$, by performing the modular exponentiation modulo p (or modulo $k_p.p$ in the case of the use of masked values) of the element M to the power R:

$E_2=M^R$ mod p (or $E_2=M^R$ mod $k_p.p$ in the case of masked values)

In the multiplicative group $Z/pZ-\{0\}$, this modular exponentiation operation amounts to combining, by means of the modular multiplication modulo p (or modulo $k_p.p$ in the case of masked values), elements equal to the element M and in number equal to the remainder R.

The processor then determines in step E20 the desired result $S_p$ ($S_p=M^{dp}$ mod p, or $S_p'=M^{dp}$ mod $k_p.p$ in the case of the use of masked values) by combining the first modular exponent $E_1$ and the second modular exponent $E_2$ by modular multiplication modulo p (or modulo $k_p.p$ in the case of masked values): $S_p=E_1.E_2$ mod p (or $S_p'=E_1.E_2$ mod $k_p.p$).

Two variants are now described which allow to avoid having to calculate the value $m_{dp}/a$ in step E14.

According to a first variant, step E12 is simultaneous or prior to step E10 and comprises, in addition to determining the number a by random drawing, determining two numbers $a_Q$, $a_R$ by random drawing and the construction of a replacement mask m' equal to the sum of the random number $a_R$ and the product of the random number a and the random number $a_Q$: $m'=a_R+a.a_Q$.

In this case, step E10 comprises, in addition to the operations described above, the replacement of the mask $m_{dp}$ by the replacement mask m': the current exponent dp" is then equal to $d_p'+(p'-1)-m_p+m'-m_{dp}=[d_p+(p-1)]+m'$.

By noting as above $Q'=d_p''/a$ and $R'=d_p''$ mod a (that is to say $d_p''=Q'.a+R'$), obtaining the unmasked quotient Q and of the unmasked remainder R in step E14 can then be carried out by: $Q=Q'-a_Q$ and $R=R'-a_R$.

According to a second variant, step E12 is simultaneous or prior to step E10 and comprises, in addition to determining the number a by random drawing, determining a first number $m_R$ equal to $m_{dp}$ mod $2^k$ and a second number $m_Q$ equal to $m_{dp}/2^k$ (where k is as already indicated the length in bits of the random number a), and the construction of a replacement mask m' equal to the sum of the first number $m_R$ and the product of the random number a and the second number $m_Q$: $m'=m_R+a.m_Q$. (Compared to the first variant, this second variant avoids the drawing of two random numbers; moreover, the division by a power of 2 used here is inexpensive in computing time since it can be carried out by a shift of k bits to the right of the mask $m_{dp}$).

As for the first variant, step E10 then comprises, in addition to the operations described above, the replacement of the mask $m_{dp}$ by the replacement mask m': the current exponent dp" is then equal to $d_p'+(p'-1)-m_p+m'-m_{dp}=[d_p+(p-1)]+m'$.

Obtaining the unmasked quotient Q and the unmasked remainder R in step E14 can then be carried out by: $Q=Q'-m_Q$ and $R=R'-m_R$ (still with $Q'=d_p''/a$ and $R'=d_p''$ mod a).

FIG. 4 represents a cryptographic processing method according to a second embodiment of the invention.

This method implements operations in a finite group G of order n provided with an operation noted here "*". This group G is for example a subgroup of finite order n of points of an elliptic curve E and the operation* is in this case the addition of two points of the elliptic curve E.

The method of FIG. 4 aims at determining, from a first element M of the group G (here from a point M of the elliptical curve E), a second element P equal to the combination, by means of the operation, of elements (of the group G) equal to the first element M and in number equal to an integer d. The first element M can be for example a portion at least of a message.

In the case described here where the group G is a subgroup of points of an elliptical curve E, this is noted: P=[d] M.

A second element P is sought for example to be determined in this way in the context of an exchange of Diffie-Hellman type keys (the integer d then acting as a private key), in particular:

when the first element M is a generator of the group G, the second element P then being transmitted (here via the communication module 10) to a communication partner (with which the key exchange is carried out);

when the first element M is received (here via the communication module 10) from a communication partner (with which the key exchange is carried out), the second element P then being the shared secret.

The storage module 6 stores the number d in masked form, that is to say that the masked number d' and the mask $m_d$ are stored in the storage module 6 such that $d'=d+m_d$.

The order n, the number d and the mask $m_d$ have for example a length (in bits) of at least 160 bits, for example comprised between 160 bits and 512 bits (the masked number having a length increased by 1 bit relative to the length of the number d and of the mask $m_d$ in order to be able to store a possible carry, that is to say a length of at least 161 bits, for example comprised between 161 bits and 513 bits).

The method of FIG. 4 begins with a step E30 of determining a number a by random drawing.

The method of FIG. 4 continues with a step E32 of determining a number d" by adding to the number d (here in practice in its masked version d') the order n.

Thus, even when the considered implementation allows to choose d and an attacker could deliberately choose a low value for d, the number d" will be high (the order n being high and in general not modifiable by the user).

In the implementation with masking described here, we therefore have: d"=d'+n.

According to an alternative embodiment of step E32, it is possible to add to the number d (or here to its masked version d') a multiple of the order n. This multiple can optionally be determined by drawing a random number a' (of length for example comprised between 32 bits and 128 bits) and multiplying the order n by this random number a' (the multiple being equal in this case to a'.n).

The method of FIG. 4 continues with a step E34 of determining a quotient q and a remainder r by using the Euclidean division of the number d' obtained in step E32 by the random number a.

In the example described here, to take masking into account, this step comprises, for example, the following operations:

$c=1$ if $(d"$ mod $a)<(m_d$ mod $a)$, otherwise $c=0$ $q=d"/a-m_d/a-c$ $r=(d"$ mod $a)-(m_d$ mod $a)+c\cdot a$ The use of the variable c allows to avoid having in certain cases a negative remainder r because of the unmasking operation (that is to say of subtraction of $m_d$ mod a).

The method of FIG. 4 then comprises a step E36 of obtaining (that is to say here of determining) a third element I equal to the combination, by means of the operation, of elements equal to the first element M and in number equal to the product q.a of the quotient q and the random number a.

In the case described here (where the group G is a subgroup of points of an elliptical curve E), the third element I is therefore equal to: [q.a] M.

The method of FIG. 4 then comprises a step E38 of obtaining (that is to say here of determining) a fourth element J equal to the combination, by means of the operation, of elements equal to the first element M and in number equal to the remainder r.

In the case described here (where the group G is a subgroup of points of an elliptical curve E), the fourth element J is therefore equal to: [r] M.

The method of FIG. 4 then ends with a step E40 of determining the second element P by combining the third element I and the fourth element J by means of the operation. In other words, the second element P is determined such that P=I*J.

According to a variant that can be considered for the method which has just been described, in order to avoid the calculation of $m_d/a$ during step E34, it is possible to replace the mask $m_d$ by a mask m' equal to the sum of a first intermediate number r' and the product of a second intermediate number q' by the random number a.

The replacement of the mask is for example carried out during the determination of the number d" in step E32. The operation performed during this step is in this case:

$$d''=d'+n+m'-m_d.$$

According to a first possibility, the first intermediate number r' and the second intermediate number q' can be determined (for example during step E30) by random drawing.

According to a second possibility, the first intermediate number r' is determined (for example during step E30) as equal to $(m_d \bmod 2^k)$ and the second intermediate number q' is determined (for example during the step E30) as equal to $m_d/2^k$ (this division by $2^k$ can be carried out by k shifts of one bit to the right of the binary representation of $m_d$), where k is the length in bits of the random number a.

According to the variant proposed here (whether the first possibility or the second possibility which have just been mentioned is used), the quotient q is determined in step E34 by using the second intermediate number q' (to remove masking), here by subtracting the second intermediate number q' from the masked quotient d"/a; the remainder r, in turn, is determined using the first intermediate number r' (to remove the masking), here by subtracting the first intermediate number r' from the masked remainder (d" mod a). In other words, we determine here during step E34:

$$q=d''/a-q'$$

$$r=(d'' \bmod a)-r'.$$

The second embodiment in the case where the group G is a subgroup of points of an elliptical curve E (group whose operation* is the addition of two points of the elliptical curve E) has been described above.

Alternatively, the group G could be for example a multiplicative subgroup of $Z/pZ-\{0\}$, a subgroup whose order n is a divisor of (p−1), where p is a prime number. The operation* is in this case the modular multiplication modulo p.

According to another variant, the group G could be the multiplicative group $Z/pZ-\{0\}$, where p is a prime number, the order of the group G being in this case equal to (p−1). The operation* is in this case the modular multiplication modulo p.

The invention claimed is:

1. A cryptographic processing method comprising the determination, in a finite order group provided with an operation and from a first element (M) of this group, of a second element ($S_p$; P) equal to the combination, by means of said operation, of elements equal to the first element (M) and in number equal to a first number ($d_p$), wherein said cryptographic processing method comprises the following steps:
   obtaining (E10; E32) a second number (d") determined by adding to the first number ($d_p$) said order or a multiple of said order;
   determining (E12; E30) a random number (a);
   determining (E14; E34) a quotient (Q; q) and a remainder (R; r) using the Euclidean division of the second number (d") by the random number (a);
   obtaining (E16; E36) a third element ($E_1$; I) equal to the combination, by means of said operation, of elements equal to the first element (M) and in number equal to the product of the quotient (Q; q) and the random number (a);
   obtaining (E18; E38) a fourth element (E2; J) equal to the combination, by means of said operation, of elements equal to the first element (M) and in number equal to the remainder (R; r);
   determining (E20; E40) the second element (Sp; P) by combining the third element ($E_1$; I) and the fourth element ($E_2$; J) by means of said operation.

2. The method according to claim 1, comprising a step of determining another random number, wherein the second number (d") is obtained by adding to the first number ($d_p$) the product of the other random number and said order.

3. The method according to claim 1, implemented within an electronic device (2) comprising a storage module (6), wherein the first number ($d_p$) is stored in the storage module (6) in masked form.

4. The method according to claim 1, comprising a step of constructing a mask equal to the sum of a first intermediate number and the product of a second intermediate number by said random number;
   wherein the step of obtaining the second number (d") comprises a step of applying the constructed mask and,
   wherein the quotient (Q; q) is determined using the second intermediate number and wherein the remainder (R; r) is determined using the first intermediate number.

5. The method according to claim 4, wherein the first intermediate number and the second intermediate number are determined by random drawing.

6. The method according to claim 4, wherein the first number ($d_p$) is stored masked by an initial mask and wherein the second intermediate number and the first intermediate number are respectively determined as quotient and remainder of the Euclidean division of the initial mask by a power of two.

7. The method according to claim 1, wherein said group is the multiplicative group $Z/pZ-\{0\}$, where p is a prime number, said order being equal to (p−1).

8. The method according to claim 1, wherein said group is a subgroup of points of an elliptical curve, said operation being an addition of points of the elliptical curve.

9. The method according to claim 1, wherein said group is a multiplicative subgroup of $Z/pZ-\{0\}$, where p is a prime number, and wherein said order is a divisor of (p−1).

10. A non-transitory processor-readable recording medium, comprising a computer program stored thereon, which comprises instructions for performing a method according to claim 1, when the instructions are executed by a processor.

11. An electronic device (2) comprising a processor (4) and a storage module (6) storing computer program instructions suitable for, when these instructions are executed by the processor (4), determining, in a finite order group provided with an operation and from a first element (M) of this group, a second element ($S_p$; P) equal to the combination, by means of said operation, of elements equal to the first element (M) and in number equal to a first number ($d_p$), by means of the following steps:
   obtaining (E10; E32) a second number (d") determined by adding to the first number ($d_p$) said order or a multiple of said order;

determining (E12; E30) a random number (a);

determining (E14; E34) a quotient (Q; q) and a remainder (R; r) using the Euclidean division of the second number (d") by the random number (a);

obtaining (E16; E36) a third element ($E_1$; I) equal to the combination, by means of said operation, of elements equal to the first element (M) and in number equal to the product of the quotient (Q; q) and the random number (a);

obtaining (E18; E38) a fourth element ($E_2$; J) equal to the combination, by means of said operation, of elements equal to the first element (M) and in number equal to the remainder (R; r);

determining (E20; E40) the second element ($S_p$; P) by combining the third element ($E_1$; I) and the fourth element ($E_2$; J) by means of said operation.

\* \* \* \* \*